(12) United States Patent
Maurer

(10) Patent No.: US 6,315,502 B1
(45) Date of Patent: Nov. 13, 2001

(54) CUTTING TOOL WITH MEANS FOR CONTROLLING THE FORMATION OF CHIPS

(75) Inventor: Eugen Maurer, Ober-Moerlen (DE)

(73) Assignee: Jakob Lach GmbH & Co. KG (DE)

( * ) Notice: Subject to any disclaimer, the term of this patent is extended or adjusted under 35 U.S.C. 154(b) by 0 days.

(21) Appl. No.: 09/492,948

(22) Filed: Jan. 27, 2000

(30) Foreign Application Priority Data

Jan. 26, 1999 (DE) .............................. 199 03 037

(51) Int. Cl.[7] .................................................. B23B 27/20
(52) U.S. Cl. .............................. 407/119; 407/118; 51/309
(58) Field of Search .................................. 407/114, 115, 407/116, 117, 118, 119; 51/309, 307

(56) References Cited

U.S. PATENT DOCUMENTS

| 2,870,523 | | 1/1959 | Richard . | |
|---|---|---|---|---|
| 2,955,349 | * | 10/1960 | York .......................................... | 407/5 |
| 4,159,885 | | 7/1979 | Schott . | |
| 4,189,264 | | 2/1980 | Kraemer . | |
| 4,414,870 | * | 11/1983 | Peterson Jr. et al. ................... | 82/158 |
| 4,561,810 | * | 12/1985 | Ohno ..................................... | 407/118 |
| 4,714,385 | * | 12/1987 | Komanduri ........................... | 407/119 |
| 4,854,784 | * | 8/1989 | Murray et al. ........................ | 407/114 |
| 4,856,942 | * | 8/1989 | Bernadic et al. ..................... | 407/114 |
| 5,193,948 | | 3/1993 | Noggle . | |
| 5,215,415 | * | 6/1993 | Fukuoka et al. ...................... | 407/116 |
| 5,246,315 | * | 9/1993 | Hansson et al. ...................... | 407/114 |
| 5,302,060 | * | 4/1994 | Nystrom et al. ...................... | 408/224 |
| 5,405,711 | | 4/1995 | Noggle . | |
| 5,772,366 | | 6/1998 | Wiman et al. . | |
| 6,146,064 | * | 11/2000 | Floto .................................... | 407/114 |

FOREIGN PATENT DOCUMENTS 0 730 925   9/1996   (EP) .

* cited by examiner

Primary Examiner—Henry Tsai
(74) Attorney, Agent, or Firm—Larson & Taylor, PLC

(57) ABSTRACT

A cutting tool has a chip breaker, disposed in the region of the chip face, for preventing uncontrolled chip formation. The chip breaker is disposed at a certain spacing from the cutting edge of a diamond layer that is applied to a substrate body. In prior art versions, a joint remained between the chip breaker and the diamond layer, and chips could penetrate the joint and become stuck there. To prevent this, the diamond layer, in the region of the chip breaker, is recessed down to the substrate body and that the chip breaker is applied there directly to the substrate body. In this way, a chip breaker can be disposed with a good hold in the vicinity of the cutting edges without sacrifices in terms of the strength of the cutting layer.

11 Claims, 3 Drawing Sheets

CUTTING TOOL WITH MEANS FOR CONTROLLING THE FORMATION OF CHIPS

Figure 1:
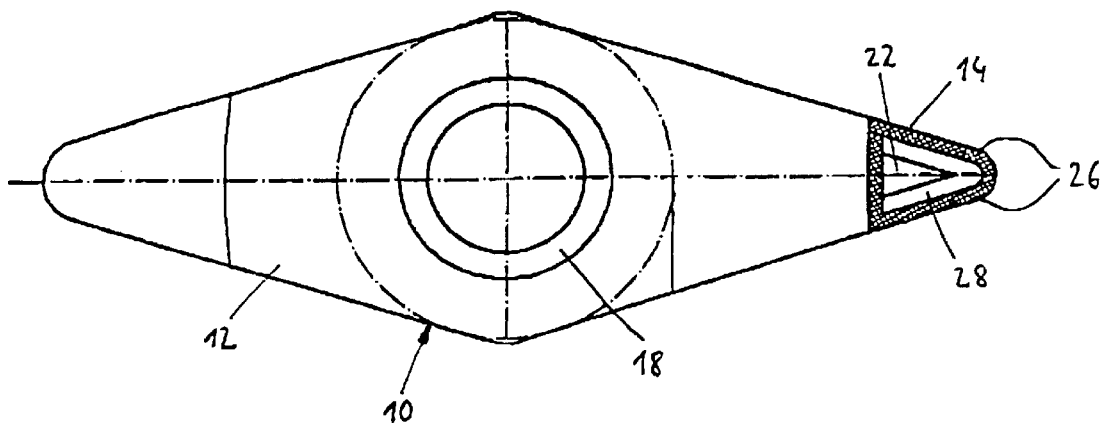

The invention relates to a cutter tool, having means, disposed in the region of the chip face, for preventing uncontrolled chip formation, which means are disposed at a certain spacing from a cutting edge at a layer of polycrystalline diamond (PKD) or polycrystalline boron tride (PKB), which is applied to a substrate body.

In chip-forming machining in particular of tough materials, such as nonferrous metals or plastics, the attempt is made to prevent the uncontrolled formation of long chips, because among other effects they can damage the machined surfaces. For that purpose, so-called chip breakers, which break the chips to a short length, and chip guide stages, which in a purposeful way divert the long chips away from the working region, are known. Since such means for preventing uncontrolled chip formation should be disposed as close as possible to the cutting edge if they are to operate effectively, the problem arises in cutting tools with cutting materials of polycrystalline diamond (PKD) or polycrystalline boron nitride (PKB) that the layer comprising these materials forms the chip face, and separate means cannot be reliably secured to that layer. The attempt is made to overcome this by soldering the cutting tools into a slit in a tool holder, but only a soldered connection between the substrate body and the slit is possible, while a narrow joint remains between the surface of the layer of PKD or PKB and the means for chip control. It turns out that chips can become stuck in this joint, and as a result on the one hand the tool carrier wears down rapidly, and on the other, damage to the surface of the workpiece material can occur.

The object of the invention is to create a cutting tool with a cutting material of PKD or PKB that makes it possible to have means for chip control without there being a joint toward the chip face in the vicinity of the cutting edge.

According to the invention, this object is attained in that the layer of PKD or PKB is recessed, in the region of the means for preventing uncontrolled chip formation, down to the substrate body, and the means for preventing uncontrolled chip formation are applied there directly to the substrate body.

The subsequent removal of the layer of PKD or PKB in the region of the recess, for instance by electroerosion, allows a precise approach to the cutting edge to a distance that would not be attainable in the production of the layer. Precise spacing of the means for preventing uncontrolled chip formation, of preferably about 0.3 to 1.5 mm, does not increase the risk of brittle breakage of the very vulnerable cutting materials.

A further advantage of the invention is that the cutting tool of the invention can be manufactured in a very economical way, and practically any means for chip control, in terms of their form, can be applied to the substrate body. Since these means are anchored on the substrate body in the vicinity of the cutting edge, a very firm hold of these means is also obtained, since in comparison to the formerly conventional versions, only a very short lever travel arm length exists between the engagement point of the chips and the anchoring point of the means for chip control on the substrate body. Because of the nearness of the anchoring point to the cutting edge, relatively tall chip breaking or chip guiding means can be made, if that should be desired.

The thickness of the layer of PKD or PKB is preferably about 0.3 to 1.5 mm. Such layer thicknesses can be attained by the known production processes for cutting tools; thin layer thicknesses offer the advantage that the electroerosion operation is less time-consuming and thus entails lower costs. It is especially favorable for the forming of the recess if the layer of PKD or PKB is applied to the substrate body by deposition of the cutting material in the vapor phase, because the coatings, for instance of diamond, that can be made in this way have only a slight layer thickness and are therefore especially easy to penetrate electroerosively in the machining process.

The cutting tool of the invention can be embodied as an insert for a holder or as an indexable cutter plate with a plurality of cutting edges.

The means for preventing uncontrolled chip formation can be surrounded on all sides by a remaining rib of the layer of PKD or PKB. In that case, the control means are secured solely to the substrate body of the cutting tool. Depending on the kind of use, it can also be expedient for the layer of PKD or PKB to be removed completely toward one edge of the holder, so that the control means can be soldered, welded or glued to both the substrate body of the cutting tool and to its holder, in order to achieve additional stability.

Preferably, the means for preventing uncontrolled chip formation, and/or the substrate body, comprise hard metal or high-alloy chromium tungsten tool steel (high-speed steel). It is especially ideal to make both parts of hard metal, since hard metal is especially resistant to damage from the chips, and this enables a good bond between the control means and the substrate body, for instance by soldering. On the other hand, steel parts can be better welded.

Depending on the area of use of the cutting tool and the material to be machined in chip-forming fashion, the means for preventing uncontrolled chip formation can be embodied as a chip guide stage for carrying away any developing chips, or as a chip breaker to shorten the chips to a harmless length.

In the embodiment as a chip breaker, the chip breaker expediently protrudes to from 0.5 to 3.0 mm above the layer of PKD and PKB and is beveled on its flank toward the cutting edge by about 40–50°. As an alternative to the beveling or in addition to it, the upper edge of the chip breaker, oriented toward the cutting edge, can be rounded with a radius of 0.5 mm, for example.

It is understood that the cutting tool of the invention, in all its possible embodiments, can be embodied as a drilling or milling tool or a lathe tool.

Figure 2:
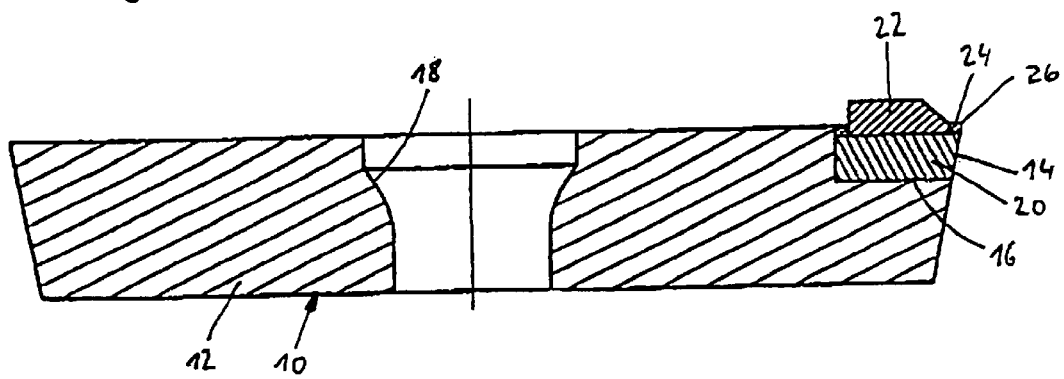
Figure 3:
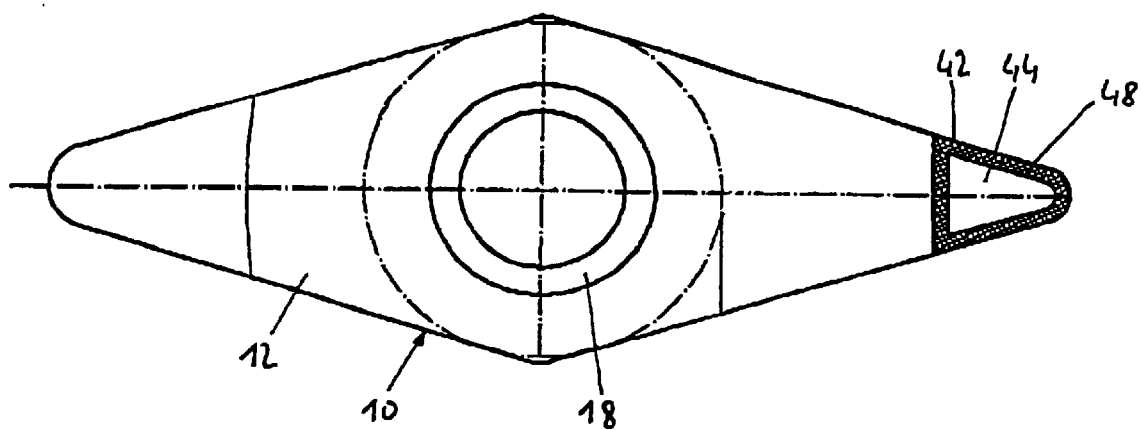
Figure 4:
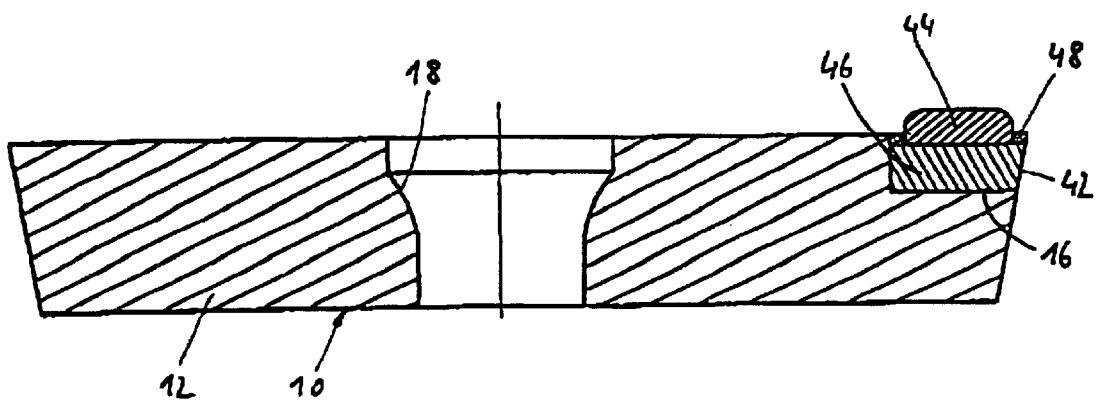
Figure 5:
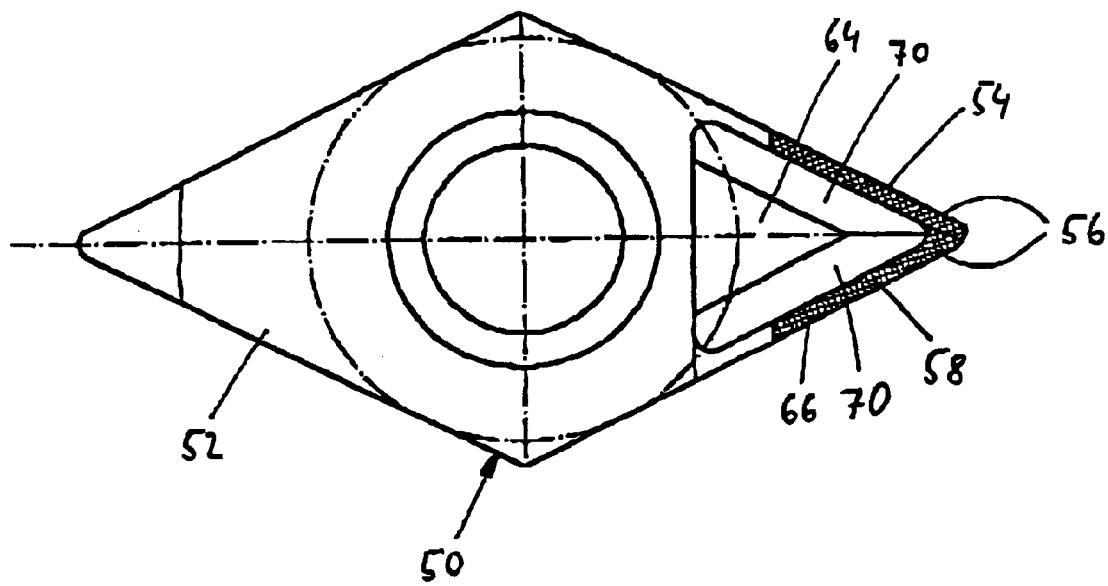
Figure 6:
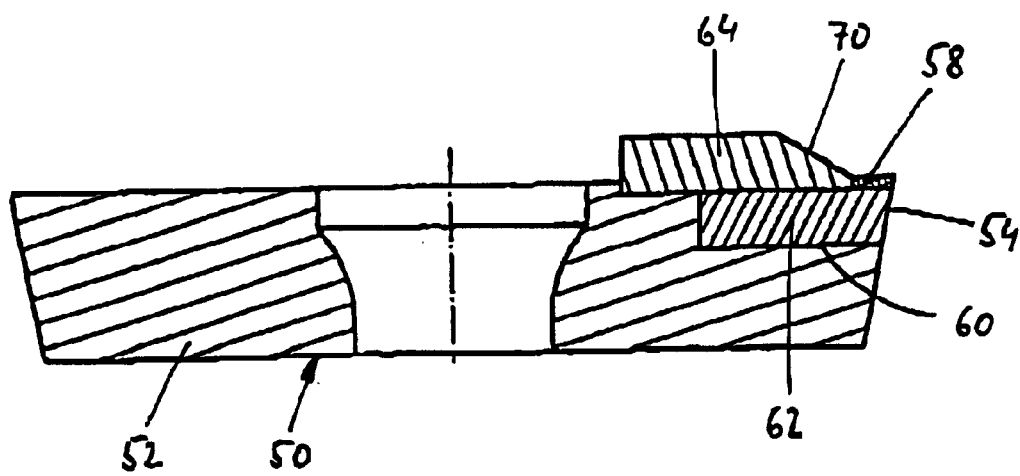

Exemplary embodiments of the invention are described in further detail below in conjunction with the drawings. Shown are:

FIG. 1, a plan view of a tool;

FIG. 2, a longitudinal section through the tool of FIG. 1;

FIG. 3, a plan view on a further tool with a differently embodied chip breaker;

FIG. 4, a longitudinal section through the tool of FIG. 3;

FIG. 5, a plan view on a further embodiment of a tool with a chip breaker;

FIG. 6, a longitudinal section through the tool of FIG. 5.

In FIG. 1, a tool 10 is shown that substantially comprises a holder 12 and a cutter insert 14. The cutter insert 14 is seated in a suitably shaped recess 16 on one end of the holder 12, and the holder is provided in the middle with a securing bore 18 that enables precise securing of the tool 10 to a further holder (not shown).

The cutter insert 14 substantially comprises a substrate body 20, a chip breaker 22 soldered to it, and a layer 24 of polycrystalline diamond (PKD), applied to the substrate body 20, that extends conformally around the chip breaker 22. Both the substrate body 20 and the chip breaker 22 are of hard metal. The substrate body 20 is soldered to the recess 16, so that the cutter insert 14 is materially firmly joined to the holder 12.

The production of the cutter insert 14 is done in such a way that first a layer of PKD, with a thickness in the present case of 0.3 mm, is applied to the substrate body 20. Besides the conventional methods, it is also conceivable to apply the diamond material by deposition from the vapor phase.

Next, by electroerosive machining (EDM) in the course of profiled cavity sinking, or by means of laser or some other suitable erosion or evaporation process, the layer in the middle region is removed down to the substrate body 16, so that only a rib approximately 0.3 to 1.5 mm in width remains between the chip breaker 22 and the cutting edges 26 of the cutter insert 14. Even in the region contacting the recess 16, a rib of 0.4 mm in width remains in the cutter insert 14. Next, the chip breaker 22, whose flanks 28 toward the cutting edges are beveled by about 45°, is soldered directly to the substrate body 20. The electroerosion permits such precise recessing of the PKD layer 24 that no substantial weakening of the cutting material occurs, and thus there is no risk of brittle breakage.

The recess 16 is made so deep, in the example shown, that the upper edge of the PKD layer 24 is flush with the surface of the holder 12.

During the chip-forming machining, the flanks 28 of the chip-breaker 22 that are located in the immediate vicinity of the cut face assure that chips that form will be broken soon, and so long chips cannot form. Securing the chip breaker 22 to the substrate body 20 over a large area, extending into the vicinity of the cutting edges 26, also assures a good introduction of force into the substrate body 20 without substantial bending moments. Since the joint between the chip breaker 22 and the remaining PKD material is not located in the direction of motion of the chips that form, the risk of penetration of chips into this joint is precluded.

FIG. 3 shows a further tool 30, whose holder 12 is equivalent to the holder of the tool 10 shown in FIGS. 1 and 2. Soldered into the recess 16, however, is a cutter insert 42 in which a chip breaker 44 is soldered to the substrate body 46, whose upper edges are rounded with a radius of about 0.5 mm. The PKD layer 48 corresponds in its dimensions to those of the cutter insert 14 of FIGS. 1 and 2. The rounded edges of the chip breaker, which as in the previously described exemplary embodiment extends about 0.5 to 1.5 mm above the PKD layer 48, represent an alternative to the inclined flanks 28 of the cutter insert 14 shown in FIGS. 1 and 2. The substrate body 42 and the chip breaker 44 again both comprise hard metal, for the sake of attaining a good materially joined bond between the two parts by means of soldering.

A further exemplary embodiment of a tool 50 is shown in FIG. 5. This tool 50 comprises a holder 52 and a cutter insert 54, which differ in geometry from the two tools 10, 30 described above. In the cutter insert 54, the cutting edges 56 of the PKD layer 58 converge not at an angle of 35° for a tip radius of 0.8 mm, but rather at an angle of 55° with a tip radius of 0.4 mm. Another distinction from the embodiments described above is that the cutter insert is soldered into a graduated recess 60 in the holder 52. The graduated recess 60 makes it possible to provide a chip breaker 64 which protrudes past the substrate body 62 of the cutting tool 54 on the side remote from the cutting edges 56 and which is soldered to both the holder 52 and the substrate body 62. If the chip breaker 64 is to be welded on, it is recommended that on the underside of the rear end, where it is to be welded to the holder 52, it be provided with a flat protrusion shaped like the heel of a boot. This protrusion, approximately 0.1 to 0.2 mm in height, for instance, given a flat bearing face on the substrate and holder, assures a reliable, uniform contact pressure against the holder in the welding operation. The special embodiment of the chip breaker 64 requires that the PKD layer 58, after being applied to the substrate body 62, be recessed down to a remaining V-shaped angle 66 in the region of the cutting edges 56. The chip breaker 64 in turn has flanks 70, beveled by approximately 45°, that are oriented toward the cutting edges 56 for breaking any chips that form.

Instead of the chip breaker provided in the exemplary embodiments shown, it is also conceivable to apply chip guide stages to the substrate bodies of the cutter inserts; the task of these chip guide stages is not to break the chips to a short length but rather the targeted diversion of developing chips.

Depending on the application, for instance in particular for machining relatively solid materials, the layers applied to the substrate bodies for forming the cutting edges also comprise polycrystalline PKB, which is also known as CBN.

It is naturally also conceivable for the arrangement according to the invention of means for controlling chip formation to be applied to full-layer plates, such as indexable cutter plates, in which the separate holders can be omitted.

The rake and clearance angles can be adapted to the particular kind of use of the cutting tool, regardless of how the chip breakers are disposed. Correspondingly modified cutter inserts are suitable for use in both drilling and milling tools and in lathe tools.

What is claimed is:

1. A cutting tool comprising:

a substrate body;

a layer of polycrystalline diamond or polycrystalline boron nitride, the layer
   (a) being applied to the substrate body,
   (b) having a cutting edge and a chip face, and
   (c) having a recess formed in the chip face at a certain spacing from the cutting edge down to a portion of the substrate body; and a means disposed in the recess of the chip face of the layer for preventing uncontrolled chip formation, the means for preventing uncontrolled chip formation being applied directly to the portion of the substrate body.

2. The cutting tool of claim 1, wherein the means for preventing uncontrolled chip formation are secured in materially joined fashion to the portion of the substrate body.

3. The cutting tool of claim 2, wherein the means for preventing uncontrolled chip formation are provided on an underside thereof, in a rear region thereof, with a flat protrusion having a flat lower face.

4. The cutting tool of claim 1, wherein the recess in the layer is produced by an erosion or evaporation method.

5. The cutting tool of claim 1, wherein the layer is applied to the portion of the substrate body by deposition thereof in the vapor phase.

6. The cutting tool of claim 1, wherein the means for preventing uncontrolled chip formation are embodied as a chip guide stage.

7. The cutting tool of claim 1, wherein the means for preventing uncontrolled chip formation are embodied as chip breakers.

8. The cutting tool of claim 7, wherein a flank, oriented toward the cutting edge, of the chip breaker is beveled by approximately 40–50°.

9. The cutting tool of claim 1, wherein the cutting tool is a drilling tool, milling tool or lathe tool.

10. The cutting tool of claim 1, wherein the substrate body, the layer and the means for preventing uncontrolled chip formation are embodied as an insert, and further including a holder for the insert.

11. The cutting tool of claim 1:
further including a holder; and
wherein the means for preventing uncontrolled chip formation are secured in materially joined fashion to the portion of the substrate body and to the holder.

* * * * *